Sept. 6, 1927.

R. H. PRATT 1,641,692

VARIABLE SPEED TRANSMISSION

Filed Oct. 2, 1926

Inventor
Ross H. Pratt
by Ralph S. Turff
Attorney

Sept. 6, 1927.  R. H. PRATT  1,641,692
VARIABLE SPEED TRANSMISSION
Filed Oct. 2, 1926   6 Sheets-Sheet 4

Inventor
ROSS H. PRATT
By Ralph S. Turff
Attorney

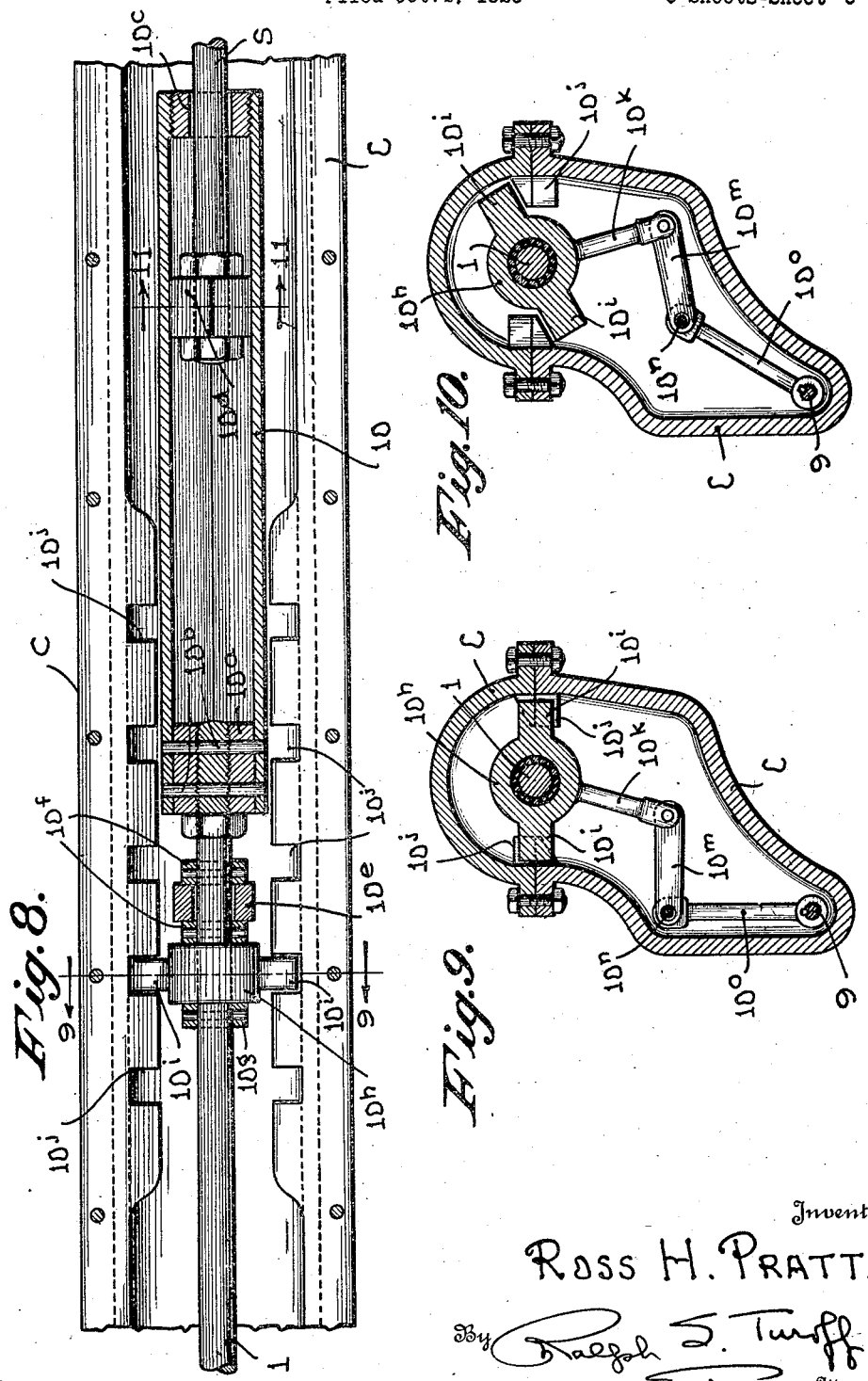

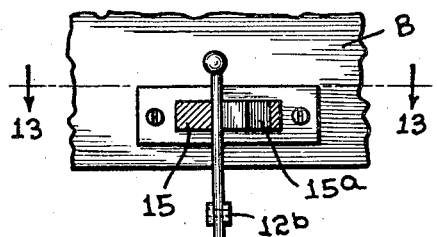
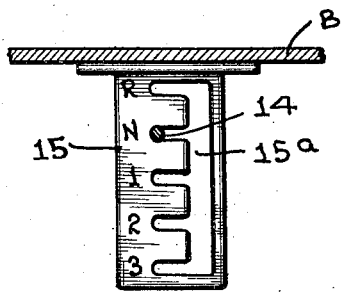
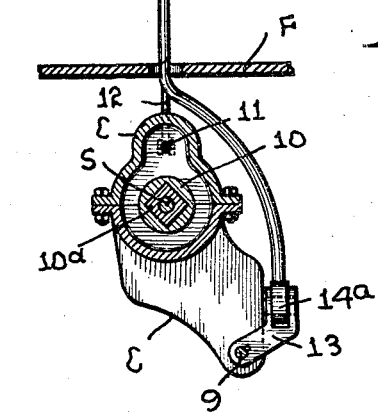
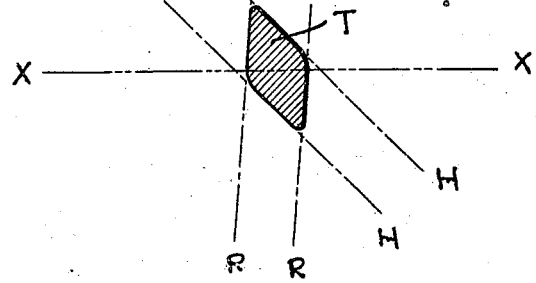
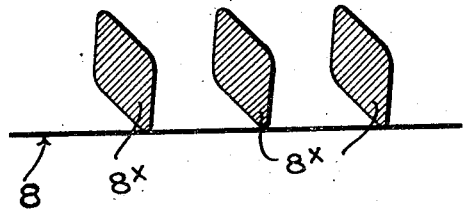
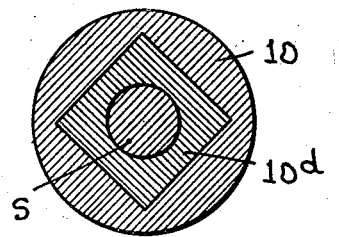

Patented Sept. 6, 1927.

1,641,692

UNITED STATES PATENT OFFICE.

ROSS H. PRATT, OF WASHINGTON, DISTRICT OF COLUMBIA.

VARIABLE-SPEED TRANSMISSION.

Application filed October 2, 1926. Serial No. 139,170.

This invention relates to variable speed transmissions, and more particularly to variable speed transmissions especially designed for use in connection with motor vehicles.

It is a major purpose of the present invention to provide a variable speed transmission of the so-called "worm type" wherein variation of speed is had through operatively engaging worms of varying pitches with a clutch-controlled driving gear operatively connected with the driven member or rear axle of the motor vehicle.

It is a further object of the present invention to provide an improved transmission wherein acceleration or deceleration of speed may be conveniently had, and wherein, if desired, the change may be readily made from a high to a lower gear for the purpose of utilizing the engine as a braking power when descending grades. It is a still further purpose of the present invention to provide an improved transmission wherein a change to a slow speed is made easy when traffic conditions require the same, without cutting off the fuel supply or otherwise reducing the pulling power of the engine or overburdening the engine by excessive application of brakes, the lower speed or gear giving the engine greater leverage and eliminating the danger of stalling on railway or street car tracks or in other dangerous places when driving slowly.

In the general type of so-called "sliding gear transmissions", wherein a gear must be brought from a position at rest into engagement with another gear through a sliding movement, it is difficult and often impossible to effect such engagement when the speed at which the vehicle is travelling is greater than the speed at which the engine shaft is revolving, which is generally the condition when the vehicle is descending a grade. Accordingly with the aforesaid sliding gear type of transmission it becomes dangerous and in most instances impossible to accomplish such a shifting of gears to utilize the braking power of the engine at a lower speed. In the present invention, with the use of a plurality of differently pitched worms adapted to selectively engage or mesh with a driving gear, any desired change or variation from a high to a lower gear or vice versa may be conveniently had.

It is a further object of the present invention to provide an improved transmission relatively silent or noiseless, of the type set forth, which will drive as silently in its low or intermediate speeds as in its high speed or gear; all speeds being a direct drive from the engine shaft. It is a still further object of the present invention to provide in a variable speed transmission of the type set forth means for automatically operating the novel clutch connection between the drive and driven members.

Transmissions of the "worm type" are at present manufactured wherein a worm secured upon the drive shaft engages with a worm gear mounted upon the driven member or rear axle. These transmissions in order to permit of the vehicle "coasting" as under its own momentum, must of necessity have the pitch of the worm on the drive shaft extremely steep. This results in a relatively great degree of side thrust causing waste of power in starting and frequent stripping and damaging of worms, gears and other parts. It is accordingly a major object of the present invention to provide means whereby a relatively lower pitched worm might be as conveniently employed, particularly for starting and for running in low and reverse speeds, such means comprising the mounting of the driving gear, commonly called the "ring gear" upon the driven member with a clutch connection therebetween.

It is a further object of the present invention to provide novel driving gear which will readily and conveniently properly engage or mesh with any one of a desired plurality of differently pitched worms.

It is a still further object of the present invention to provide novel clutch control mechanism for the driving gear; novel means for shifting any desired one of the various worms into engagement with the driving gear; and novel connections between such shifting mechanism and the clutch control mechanism.

It is a still further object of the present invention to provide mechanism including a lever, whereby the various changes in gearing may be had in proper sequence by a continuous movement of the lever in one direction. Further objects of the invention and novel features thereof will be hereinafter more fully set forth.

The accompanying drawings illustrate one practical transmission embodying the invention which will be described in detail to enable others to understand and use the same, but the invention is not considered restricted to the specific construction shown in the drawings, and reference is therefore had to the claims for summaries of the essentials of the invention and of the novel features of construction and of the novel combinations of parts for all of which protection is desired.

As shown in the drawings:

Figure 8 is a detail sectional view taken on the line 8—8 of Figure 1, looking in the direction of the arrows, illustrating the extension sleeve and locking mechanism therefor, controlling the shifting of the various worms into engagement with the driving gear.

Figure 9 is a detail sectional view taken on the line 9—9 of Figure 8, looking in the direction of the arrows, illustrating the lock member and controlling levers for securely retaining the extension sleeve in any desired position.

Figure 10 is a detail sectional view similar to Figure 9, illustrating the lock member and levers in disengaged position.

Figure 11 is a detail sectional view taken on the line 11—11 of Figure 8.

Figure 12 is a detail sectional view taken on the line 12—12 of Figure 1, illustrating the shifting lever and guide bracket therefor.

Figure 13 is a detail sectional view taken on the line 13—13 of Figure 12, illustrating the shifting lever guide bracket.

Figure 14 is a diagrammatical view illustrating the development of the cross sectional shape on one of the teeth on the driving gear capable of proper engagement with any desired one on the differently pitched worms.

Figure 15 is a diagrammatical view illustrating the proper angular relationship, in plan view, developed, of the teeth on the driving gear.

Figure 1:
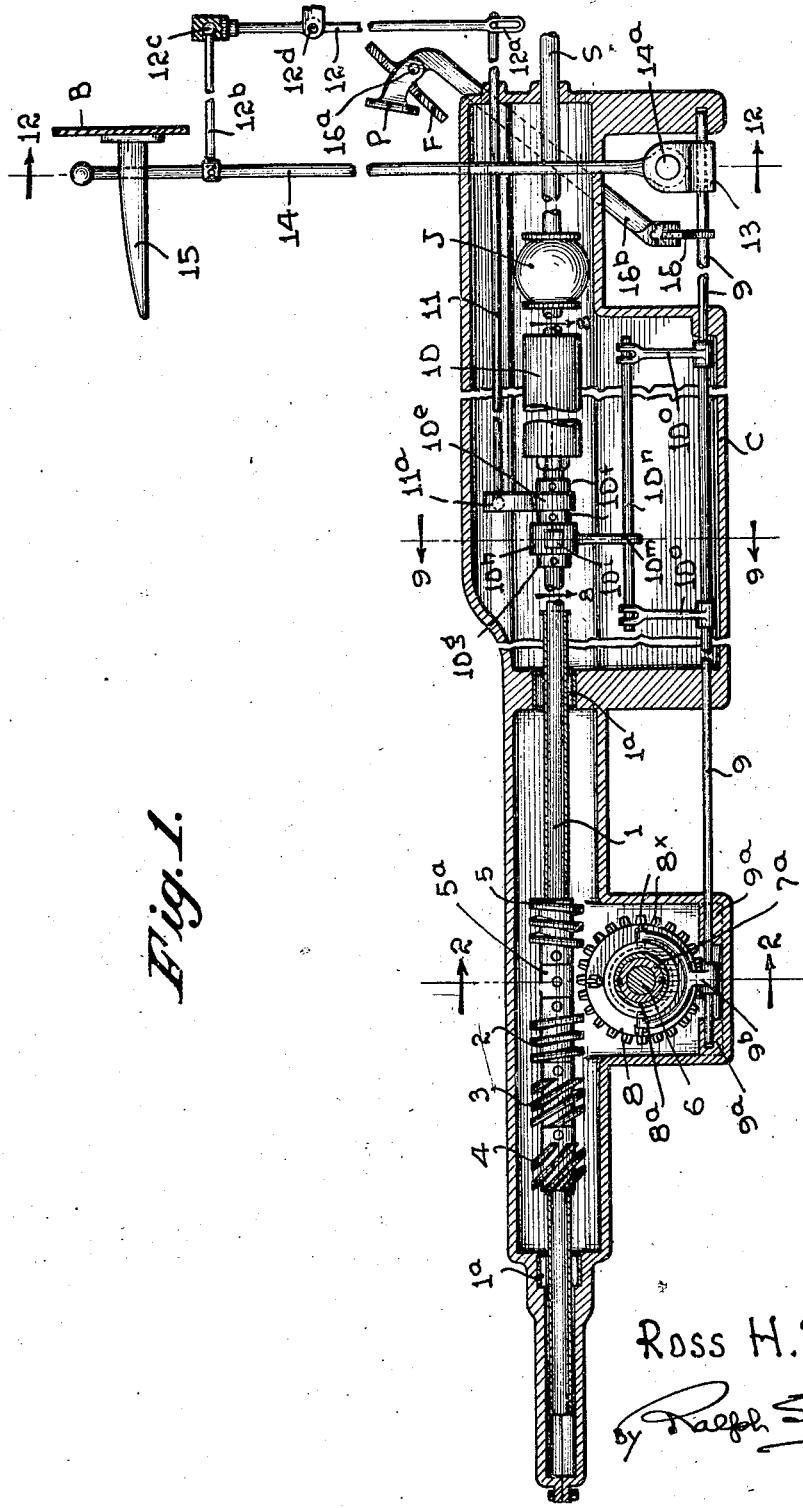
Figure 1 is a longitudinal sectional view through the entire transmission, parts being broken away, illustrating the operative mechanism therefor.

As shown in the drawings, a drive shaft 1, carrying a plurality of worms 2, 3, 4 and 5 of varying pitches rigidly secured thereto, is slidably mounted within suitable bearings $1^a$ of any desired type, properly positioned within the transmission housing or casing C. The shaft 1 is mounted for endwise movement and may be provided with sleeve-like bushings adapted to engage within the bearings $1^a$.

Suitably positioned adjacent the rear of the transmission housing, and preferably beneath the drive shaft, is the driven member, comprising the "rear end" of the motor vehicle. As is usual in motor vehicle construction, this "rear end" comprises a pair of axially aligned axles or shafts 6 having their inner extremities terminating in the usual differental (not shown) mounted wthin the usual differential housing 7. The differential housing 7 is provided on one side thereof with a sleeve extension $7^a$, and upon this extension is mounted the driving gear 8 and the associated parts therefor as will be hereinafter more fully described. The driving gear 8 is adapted to selectively engage or mesh with any desired one of the various worms mounted upon the drive, and is provided with teeth $8^x$ particularly conformed so as to properly engage or mesh with such worms.

A suitable housing or casing is provided for the "rear end", such housing preferably forming an integral part of the transmission housing. Suitable bearings $7^b$, of any desired type, are provided, one preferably adjacent the extremity of the sleeve extension $7^a$ and the other adjacent the opposed side of the differential housing for the proper aligning of the differential and the shafts or axles 6.

Figure 2:
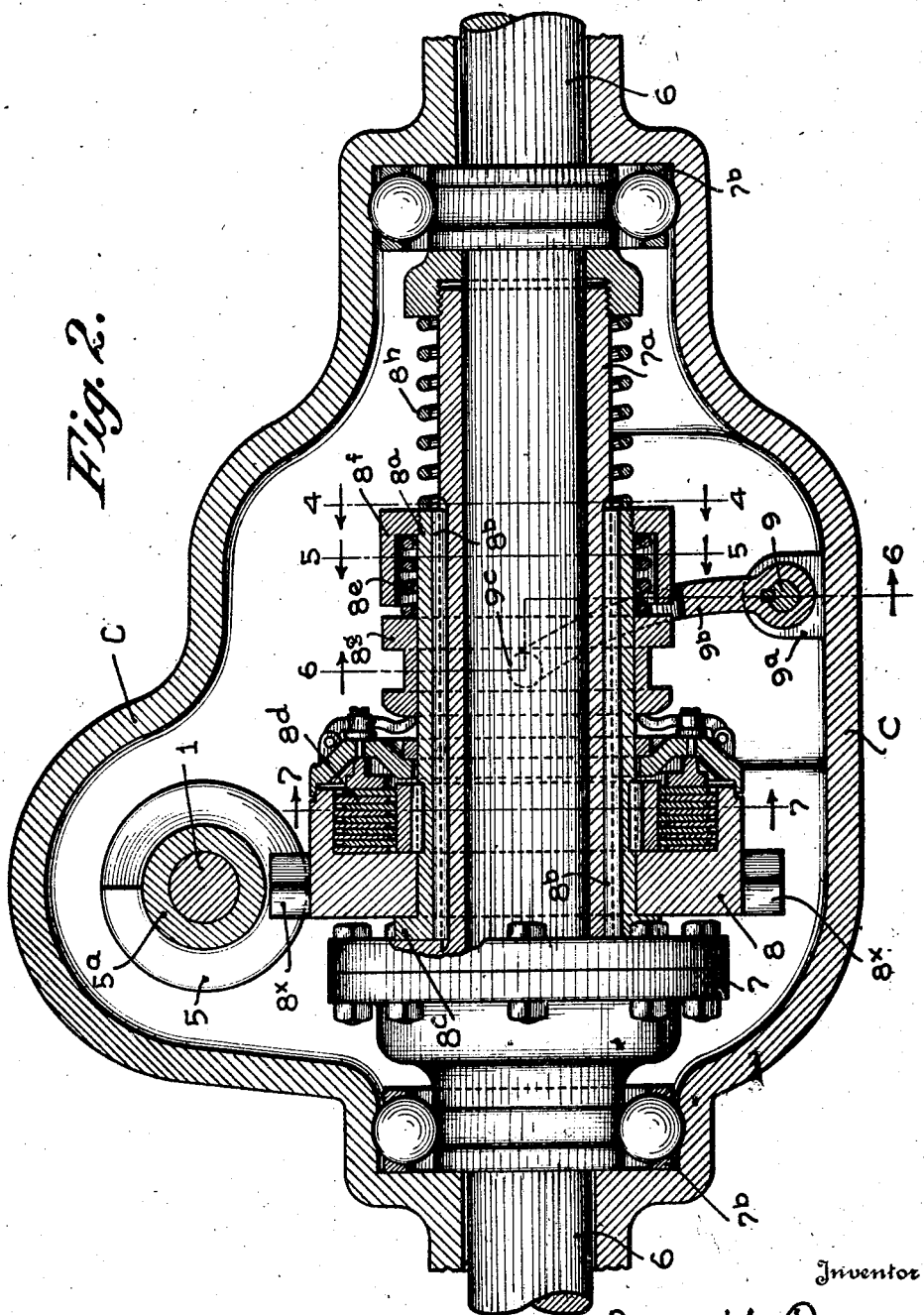
Figure 2 is a transverse sectional view taken on the line 2—2 of Figure 1, illustrating the driving gear, the clutch therefor and associated parts in operative or engaged position.

The gear 8 is mounted for free rotation upon a sleeve $8^a$ splined as at $8^b$ or otherwise slidably mounted upon the extension $7^a$. This sleeve $8^a$ is provided adjacent the inner extremity thereof with an upturned flange $8^c$ adapted to bear against the face of the differential housing when the driving gear is in engaged position as shown in Figure 2. Obviously engagement of the driving gear 8 with any desired one of the worms mounted upon the drive shaft will result in the rotation of the gear 8 in the desired direction and at the desired rate of speed.

Suitable mechanism is provided to reciprocate the drive shaft to selectively bring any desired worm into engagement with the driving gear and at the same time to disengage the driving gear and withdraw the same from the path of the drive shaft during the period of transition.

The driving gear 8 has associated therewith a suitable clutch, of any desired type, properly mounted upon the sleeve 8ª. There has been illustrated in the drawings the usual type of "disc" clutch 8ᵇ, comprising the usual outer drum preferably forming an integral part of the driving gear 8, inner drum keyed or otherwise secured to the sleeve 8ª, discs, clutch push ring, driving plate, and clutch fingers, all as are well known in the art. Obviously any other type of clutch might be used. The clutch is adapted to be held in engaged position by the pressure of a coil spring 8ᵉ interposed between the recessed lock-nut 8ᶠ secured upon the sleeve 8ª adjacent the extremity thereof, and a clutch shift ring 8ᵍ freely mounted upon the sleeve. The clutch shift ring is provided with a centrally located turned down portion adapted for engagement by the inturned extremities 9ᶜ of a clutch fork 9ᵇ secured to a countershaft 9 mounted within suitable bearings 9ª on the inner face of the transmission housing.

Figure 3:
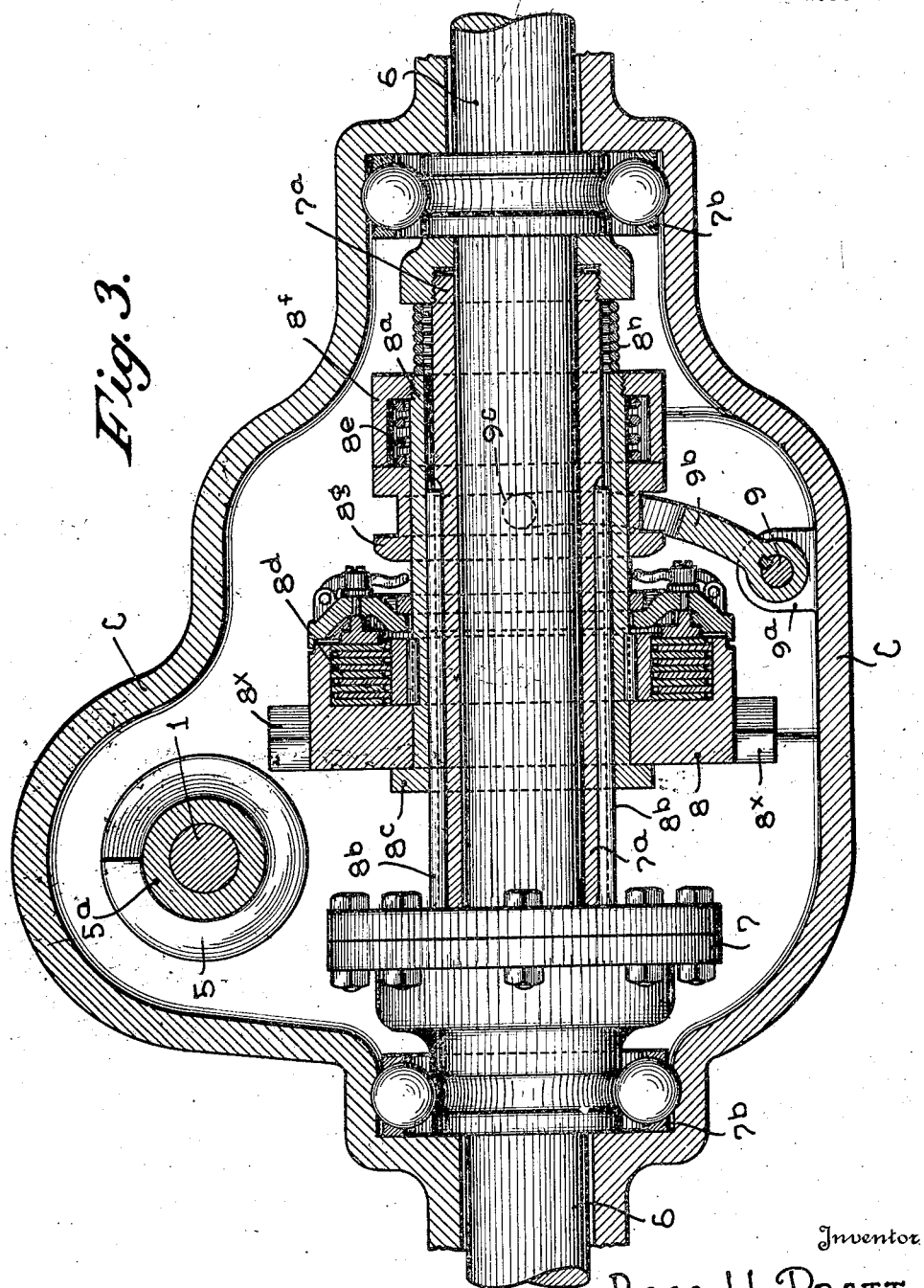
Figure 3 is a sectional view similar to Figure 2, illustrating the driving gear, the clutch therefor and the associated mechanism in inoperative or disengaged position.
Figure 4:
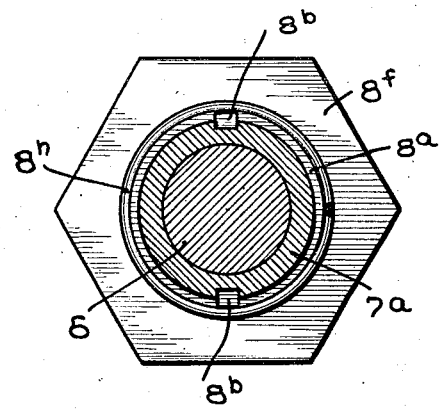
Figure 4 is a detail sectional view taken on the line 4—4 of Figure 2, looking in the direction of the arrows.
Figure 6:
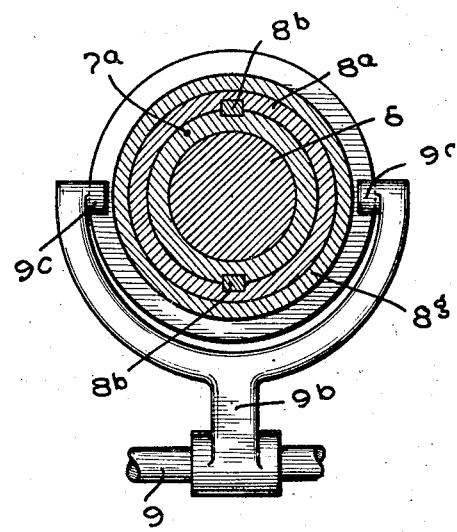
Figure 6 is a detail sectional view taken on the line 6—6 of Figure 2, looking in the direction of the arrows.
Figure 7:
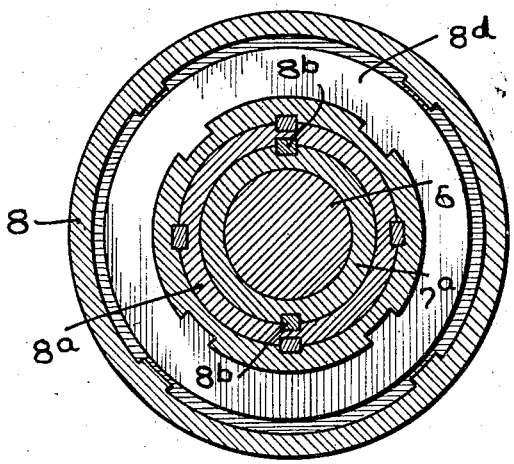
Figure 7 is a detail sectional view taken on the line 7—7 of Figure 2, looking in the direction of the arrows.
Figure 5:
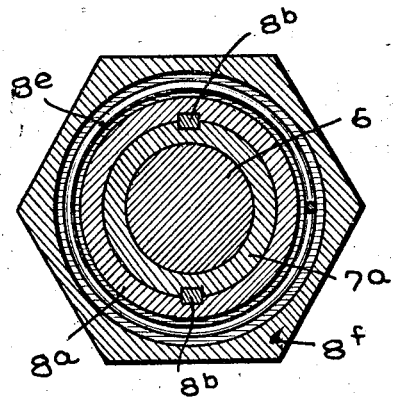
Figure 5 is a detail sectional view taken on the line 5—5 of Figure 2, looking in the direction of the arrows.

Rotation of the shaft 9 in a clockwise direction will first result in the compression of the coil spring 8ᵉ, the ring 8ᵍ being retracted until it abuts against the inner face of the lock nut 8ᶠ. At this point the clutch will have become disengaged and the driving gear will be free to rotate upon its sleeve, the load of the vehicle or pressure having been removed therefrom. Completion of the rotation of the shaft 9 will then result in the movement of the entire sleeve 8ª, carrying the driving gear therewith so as to withdraw the same from the path of the drive shaft 1 and worms thereon; the parts assuming the position as illustrated in Figure 3 of the drawings.

It will be readily understood that with the driving gear 8 in engagement with any one of the worms on the drive shaft, upon the release of the clutch the load will have been removed therefrom, and there being no relative pressure between such worm and the driving gear, it will accordingly be an easy matter to bodily slide or withdraw the gear from engaged position. The bearing 7ᵇ adjacent the sleeve 7ª has an extension thereon internally screw-threaded for engagement with the extremity of the said sleeve, a coil spring 8ʰ being interposed around the sleeve between such extremity and the opposed face of the sleeve 8ª. Rotation of the shaft 9 to cause the clutch fork to fully act to withdraw the driving gear into disengaged position will result in the compression of the coil spring 8ʰ while upon the release of the clutch fork the said spring will act to return the sleeve 8ª and the driving gear 8 therewith into engaging position.

Suitable mechanism is provided to properly move the drive shaft 1 endwise within its bearings 1ª to bring the desired worm into position for engagement with the driving gear. As shown in Figure 8 of the drawings the drive shaft has one extremity thereof rigidly secured in any desired manner to one end of a telescopic tubular member 10, as by being screw-threaded into a block 10ª securely retained within the member 10 as by pins or the like 10ᵇ. The opposed end of the member 10 is provided with a guide aperture as at 10ᶜ through which is adapted to freely pass the engine or power shaft S which preferably has the usual universal joint J properly located thereon, as is well known in the art.

Preferably the bore of the telescopic member 10 is substantially square in cross section; the inner extremity of the shaft S being provided with a block 10ᵈ adapted to snugly fit within the said bore thus assuring the proper rotation of the drive shaft through the member 10. The telescopic member 10 is adapted to slide upon the block 10ᵈ and carry therewith the drive shaft 1 to properly selectively shift the desired worm into position for engagement with the driving gear. A shifting collar 10ᵉ is mounted upon the drive shaft between lock washers 10ᶠ, the collar having an upwardly directed extension forming a ball and socket joint 11ª for connection with a shifting rod 11 passing forwardly through the transmission housing and having at its extremity a pin and slot connection 12ª with a link 12 for a purpose to be hereinafter more fully described. It will be clearly understood that movement of the shifting rod 11 will result in endwise movement of the entire drive shaft within the bearings 1ª, and at the same time identical movement will be imparted to the telescopic member 10 secured to the inner end of the drive shaft. There has thus been described an extensible driving connection between the drive and engine shafts, obviously any other type of connection might be as conveniently used, that shown being preferred.

It will be noted that the worm 2 is relatively "low" in pitch, the worms 3 and 4 being increasingly more steeply pitched, respectively, in the same direction as the pitch of the worm 2; the worms 2, 3 and 4 being intended to control respectively the low, intermediate and high speeds of the transmission. The worm 5 is oppositely pitched with respect to the other worms, and accordingly is intended to control the reverse speed. A spacing ring 5ª is secured to the drive shaft 1 between the low speed worm 2 and the reverse speed worm 5 to provide a space for a "neutral" position for the drive shaft and the driving gear without the necessity of the driving gear being withdrawn from position in alignment with the drive shaft.

Movement of the shifting collar 10ᵉ in one direction starting from the "neutral"

position will successively bring the forward driving worms 2, 3 and 4 into position for engagement with the driving gear; movement of the said shifting collar in the opposite direction will bring the reverse driving worm 5 into position for engagement with the said driving gear.

To insure the proper and secure retention of the drive shaft in any desired position, a lock member $10^h$ is freely mounted thereon between lock washers $10^f$ and $10^g$. The lock member $10^h$ is provided with preferably integral extensions or arms $10^i$ adapted to engage notches $10^j$ between teeth formed in the transmission housing, see Figures 8 to 10 inclusive, thus preventing endwise movement of the drive shaft when such arms are in engaged position. The number of such notches corresponds to the number of proper positions of the drive shaft, in the present disclosure—reverse, neutral, low, intermediate and high. The number of such positions would of course depend on the desired number of speeds and could be varied at will. The lock member $10^h$ is provided with an integral downwardly directed arm $10^k$ pivotally connected by a link $10^m$ which in turn has a free pivotal connection with a rod $10^n$ mounted in a pair of arms or levers $10^o$ keyed or otherwise secured to the countershaft 9.

Partial rotation of the shaft 9 to release the clutch $8^d$ and withdraw the driving gear from the path of the drive shaft as above described, will at the same time, through the levers $10^k$, $10^m$ and $10^o$, result in the movement of the lock member to the position shown in Figure 10 of the drawings, thus disengaging the arms of the lock member from the notches $10^j$ and permitting the endwise shifting of the drive shaft. Upon the drive shaft having been properly shifted to the desired position, the return of the shaft 9 to its normal position will permit the arms $10^i$ of the lock member to engage with one of the notches $10^j$ preventing any further endwise movement or end thrust imparted to the drive shaft.

Any desired means may be provided for the proper shifting of the drive shaft to bring any desired one of the worms into position for engagement with the driving gear. In the preferred embodiment of the present invention, and as illustrated more particularly in Figure 12 of the drawings, such means comprises a shifting lever 14, pivotally secured as at $14^a$ to an arm 13 keyed or otherwise rigidly secured to the shaft 9.

Mounted upon any suitable place as the dash or instrument board B of the vehicle is a bracket or guide 15 provided with a slot $15^a$ in which the lever 14 is guided. This slot is provided along one side thereof with a plurality of cut-away portions or notches properly marked, as indicated in Figure 13 of the drawings, with the indicia "R", "N", "1", "2" and "3" for the reverse, neutral, first or low, second or intermediate, and third or high speeds respectively.

With the lever 14 seated within any one of the notches in the guide bracket 15, the shaft 9 will be in its normal position and the clutch $8^d$ will be disengaged, the driving gear being in perpendicularly aligned position with relation to the drive shaft. Movement of the lever 14 from the notch to the slot $15^a$ will result, through the arm 13, in the impartation of a sufficient rotary movement to the shaft 9 to result in the withdrawal of the driving gear from the path of the drive shaft, the various parts assuming the position as illustrated in Figure 3. The shifting lever may then be moved within the slot $15^a$, through the pivotal connection of the lever with the arm 13, to seat the lever in any desired notch and cause the shifting of the drive shaft to selectively engage the desired worm with the driving gear.

A link $12^b$ is pivotally connected to the lever 14 adjacent the upper extremity thereof, the said link having at its opposite end a ball and socket connection with the lever 12 pivotally mounted as at $12^d$. The lower end of the lever 12 has, as previously described, a pin and slot connection $12^a$ with the shifting rod 11. The fulcrum $12^d$ of the lever 12 is located adjacent the upper extremity thereof thus providing a greater movement to the lower end of the lever 12 where connection is had with the shifting rod 11 controlling the direct movement of the drive shaft. Accordingly a relatively small degree of pivotal movement of the shifting lever will result in a considerably greater degree of movement being imparted to the shifting rod 11; this relationship of movement being sufficient to control the proper movement of the drive shaft and worms thereon.

If desired to provide for the release of the clutch $8^d$ without the necessity of shifting the lever 14, a pedal P may be provided passing through an aperture in the floor boards F of the vehicle, and pivotally mounted thereunder as at $16^a$. The pedal is connected by a lever $16^b$ to a lever 16 which is in turn connected or mounted upon the shaft 9. Depression of the pedal P will result through the levers $16^b$ and 16, in the partial rotation of the shaft 9 to disengage the clutch $8^d$.

It will thus be clearly understood that during the period of shifting from one speed to another, the shifting lever will be travelling in the slot $15^a$ in the guide bracket 15, thus assuring that the shaft 9 will be rotated partially in proper position to withdraw and retain in withdrawn position— through the clutch and clutch shifting fork—the driving gear 8 from the path of movement of the worms carried by the drive shaft. Upon the release of the shaft 9 the driving gear will return to a position for engagement with the desired worm through the mechanism provided, and will approach the worm from the side and through the conformation of the teeth will readily fall into mesh or engagement therewith.

It will be noted that all of the speeds of rotation of the driving gear through the variable speed transmission described in the present invention are directly driven from the power or engine shaft, thus providing an extremely quiet drive in any speed or gear.

There has been diagrammatically illustrated in Figures 14 and 15 of the drawings a method of developing a universal tooth for the driving gear capable of meshing or engaging with any desired one of the varying pitched worms. To this end each of the worms has the perpendicular distance between the teeth thereon identically constant. As shown in Figure 14 the lines R—R illustrate the angular development, properly pitched, of the space between teeth on the worm 5 controlling the reverse speed while the lines H—H illustrate the development also properly pitched of the space between teeth on the worm 4 controlling the high speed; the line X—X being positioned to properly locate the peripheral center line of the teeth on the driving gear 8. Each tooth of the driving gear would accordingly be substantially "diamond-shaped" in cross section as defined at T by the intersection of the lines R—R and H—H, the corners having been properly rounded. Inasmuch as the angular development of the space between the teeth on any of the other worms would of necessity fall between the outermost of the lines H—H and R—R, such a tooth would securely mesh and have proper driving engagement with any desired one of the various worms.

There has thus been described a variable speed transmission of the "worm type" wherein all speeds are directly driven from the power or engine shaft; wherein any shifting of gear or speed may be readily accomplished without danger of stripping of the worms or driving gear and without the difficulty or necessity of considering the relative speed of the vehicle with respect to the speed of rotation of the engine shaft; wherein the shifting or variation from a high to a lower gear may be as readily and conveniently made as from a low to a higher gear; wherein entirely automatic control of the clutch may be had, the clutch being located at the driving gear; and wherein change of gearing is had by a continuous movement of the "gear shift" or control lever in a single direction.

The invention having thus been described, what is claimed is:

1. In a variable speed transmission including driving mechanism comprising a power shaft and a drive shaft carrying a plurality of differently pitched worms mounted thereon, a driven member comprising a pair of axles provided at their adjacent extremities with a differential and a differential gear case, an integral sleeve extension on one side of the said differential gear case, a driving gear slidably mounted on said sleeve extension, a friction clutch connection therebetween, means for bodily shifting the drive shaft longitudinally to selectively engage the worms thereon with the driving gear the said means being first operable to release the friction clutch and then to slidably withdraw the driving gear from the path of the worms on the drive shaft during the shifting operation.

2. In a variable speed transmission including driving mechanism comprising a power shaft and a drive shaft carrying a plurality of differently pitched worms mounted thereon, an extensible connection between said power and drive shafts, a driven member comprising a pair of axles provided at their adjacent extremities with a differential and differential gear case, an integral sleeve extension on one side of the said differential gear case, a driving gear slidably mounted on said sleeve extension and adapted to engage with the worms on the drive shaft, a friction clutch connection between the driving gear and the sleeve extension on the differential gear case, means for bodily shifting the drive shaft longitudinally to selectively engage the worms thereon with the driving gear the said means being first operable to release the friction clutch connection between the driving gear and the differential and then to slidably withdraw the driving gear from the path of the worms on the drive shaft during the shifting operation.

3. A variable speed transmission comprising a drive shaft carrying a plurality of worms, a driven shaft carrying a driving gear slidably mounted thereon adapted to mesh with the aforesaid forms, a friction clutch connection between said driving gear and driven shaft, a countershaft having a clutch fork mounted thereon adapted to control the aforesaid clutch, means for bodily shifting the drive shaft longitudinally to selectively engage the worms on the drive shaft with the driving gear, said means having an operative connection with the countershaft and being first operable to release the clutch and then slidably withdraw the driving gear from the path of the worms on the drive shaft during the shifting operation.

4. A variable speed transmission comprising a drive shaft carrying a plurality of worms, a driven shaft carrying a driving gear slidably mounted thereon adapted to engage with said worms, a friction clutch connection between said driving gear and driven shaft, a countershaft having a clutch fork mounted thereon adapted to actuate the aforesaid clutch, means operatively connected with said countershaft and operable to first release the aforesaid clutch and then bodily withdraw the driving gear from the path of the worms on the drive shaft, the said means having an operative connection with the drive shaft whereby the said drive shaft may be bodily shifted to selectively engage the worms thereon with the driving gear.

5. A variable speed transmission including driving mechanism comprising a power shaft and a drive shaft carrying a plurality of differently pitched worms mounted thereon, means for holding said drive shaft in desired position including a locking collar on the said drive shaft adapted to coact with stationary retaining members, an extensible connection between such power and drive shafts, a driven shaft carrying a driving gear slidably mounted thereon and adapted to engage with the aforesaid worms, a friction clutch connection between said driving gear and driven shaft, a countershaft having a clutch fork mounted thereon adapted to engage with said clutch, means operatively connected with said countershaft operable to first release the aforesaid clutch and then slidably withdraw the driving gear from the path of the worms on the drive shaft, the said means comprising a lever having an operative connection with the aforesaid locking collar on the drive shaft for bodily shifting the said drive shaft longitudinally to selectively engage the worms thereon with the driving gear.

6. A variable speed transmission comprising a driving member including a power shaft and a drive shaft, an extensible connection therebetween, a plurality of differently pitched worms carried by the drive shaft, means for holding the drive shaft in desired position comprising a locking collar mounted upon the said drive shaft and adapted to coact with stationary retaining members, a driven member comprising a pair of axles provided at their adjacent extremities with a differential and a differential gear case, an integral sleeve extension at one side of the said differential gear case, a driving gear slidably mounted on said sleeve extension and adapted to engage the worms on the drive shaft, a friction clutch connection between the driving gear and sleeve extension, a countershaft having a clutch fork mounted thereon adapted to actuate the said clutch, means operatively connected with said countershaft operable to first release the aforesaid clutch and then slidably withdraw the driving gear from the path of the worms on the drive shaft, the said means comprising a lever having an operative connection with the aforesaid locking collar on the drive shaft to bodily shift the drive shaft longitudinally to selectively engage the worms thereon with the driving gear.

7. A variable speed transmission comprising a driving member including a power shaft and a drive shaft having a plurality of differently pitched worms mounted thereon, means for holding the drive shaft in desired position comprising a locking member rigidly mounted upon the said drive shaft and adapted to coact with stationary retaining members, an extensible connection between said power and drive shafts, a driven member comprising a pair of axles having their adjacent extremities provided with a differential and differential gear case having an integral sleeve extension on one side thereof, a tubular member slidably mounted on said sleeve, a driving gear freely mounted on said tubular member, a friction clutch connection between said driving gear and tubular member, a countershaft having a clutch fork mounted thereon adapted to actuate said clutch, means for bodily shifting the drive shaft longitudinally to selectively engage the worms thereon with the driving gear, said means comprising a lever having an operative connection with the aforesaid lock member carried by the drive shaft and said means being operatively connected with the countershaft and being first operable to release the aforesaid clutch and then slidably withdraw the driving gear from the path of the worms on the drive shaft during the shifting operation.

8. A variable speed transmission comprising a driving member including a power shaft and a drive shaft having a plurality of differently pitched worms mounted thereon, means for holding the drive shaft in desired position including a locking member rigidly secured upon the said drive shaft and adapted to coact with stationary retaining members, a tubular extensible driving connection between said power and drive shafts, a driven member comprising a pair of axles provided at their adjacent extremities with a differential and differential gear case, having an integral sleeve extension at one side of the said gear case, a second sleeve slidably mounted on said first mentioned sleeve, a driving gear freely mounted on said second sleeve, a friction clutch connection between said driving gear and said second sleeve, a countershaft having a clutch fork mounted thereon adapted to actuate the said clutch, means for bodily shifting the drive shaft longitudinally to selectively engage the worms thereon with the driving gear, said means comprising a lever having an operative connection with the lock member carried by the drive shaft, said lock member being operatively connected with the countershaft, the aforesaid means being operatively connected with the countershaft and being first operable to release the clutch and then to slidably withdraw the driving gear from the path of the worms on the drive shaft during the shifting operation.

9. A variable speed transmission comprising a driving member including a power shaft and a drive shaft having a plurality of differently pitched worms mounted thereon, means for holding the drive shaft in desired position, said means comprising a locking member carried by the drive shaft and adapted to co-act with stationary retaining members, a tubular extensible driving connection between said power and drive shafts, a driven member comprising a pair of axles provided at their adjacent extremities with a differential and differential gear case having an integral sleeve extension at one side thereof, a second sleeve slidably mounted on said first mentioned sleeve, a driving gear freely mounted on said second sleeve, a friction clutch connection therebetween, a countershaft having a clutch fork mounted thereon adapted to actuate said clutch, means comprising a lever operatively connected with the countershaft and having an operative connection with the lock member carried by the drive shaft for bodily shifting the drive shaft longitudinally to selectively engage the worms thereon with the driving gear, the said means being first operable to release the clutch and then slidably withdraw the driving gear from the path of the worms on the drive shaft during the shifting operation, the aforesaid lock member having an operative connection with the countershaft for releasing said lock member during the shifting operation, and resilient means for returning the driving gear to engaging position.

10. In a variable speed transmission of the class described a drive shaft carrying a plurality of differently pitched worms mounted thereon and a driven shaft carrying a driving gear adapted to selectively mesh with said worms, the space between teeth on each of the worms being identical and the distance between the center lines of the space between such teeth also being identical, the teeth of the driving gear being disposed around the periphery thereof and being substantially diamond-shaped, the angle between parallel sides of each tooth on the driving gear being determined by the greatest angular difference between any two of the worms on the drive shaft.

11. A variable speed transmission comprising a driving member including a power shaft and a drive shaft having a plurality of differently pitched worms mounted thereon, means for holding the drive shaft in desired position, said means comprising a locking collar carried by the drive shaft and adapted to co-act with stationary retaining members, a tubular extensible driving connection between the said power and drive shafts, a driven member comprising a pair of axles provided at their adjacent extremities with a differential and differential gear case, an integral sleeve extension on one side of the said differential gear case, a second sleeve slidably mounted on the first mentioned sleeve, a driving gear mounted for free rotation on said second sleeve, a clutch connection between said driving gear and second sleeve the said clutch being slidably mounted on the said sleeve, a countershaft provided with a clutch fork adapted to actuate the said clutch, means comprising a lever operatively connected with the countershaft and having an operative connection with the aforesaid locking collar for bodily shifting the drive shaft longitudinally to selectively engage the worms thereon with the driving gear, the said means being first operable to release the clutch and then slidably withdraw the aforementioned second sleeve and the driving gear thereon from the path of the worms on the drive shaft during the shifting operation, the aforesaid locking collar having an operative connection with the countershaft for releasing said locking collar during the shifting operation, and resilient means for returning the driving gear to engaging position.

In testimony whereof he affixes his signature.

ROSS H. PRATT.